(12) United States Patent
Lim et al.

(10) Patent No.: US 9,386,243 B2
(45) Date of Patent: Jul. 5, 2016

(54) LENS SHADING CORRECTION METHOD AND IMAGE SIGNAL PROCESSING DEVICE AND IMAGE SENSOR SYSTEM EMPLOYING THE METHOD

(71) Applicant: SAMSUNG ELECTRONICS CO., LTD., Suwon-Si, Gyeonggi-Do (KR)

(72) Inventors: Dongpan Lim, Suwon-Si (KR); Taechan Kim, Yongin-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 10 days.

(21) Appl. No.: 14/578,608

(22) Filed: Dec. 22, 2014

(65) Prior Publication Data

US 2015/0189129 A1  Jul. 2, 2015

(30) Foreign Application Priority Data

Dec. 27, 2013  (KR) .................. 10-2013-0165544

(51) Int. Cl.
*H04N 5/357* (2011.01)
*H04N 5/217* (2011.01)
*H04N 9/04* (2006.01)

(52) U.S. Cl.
CPC ............. *H04N 5/3572* (2013.01); *H04N 5/217* (2013.01); *H04N 9/045* (2013.01); *H04N 2209/047* (2013.01)

(58) Field of Classification Search
None
See application file for complete search history.

(56) References Cited

U.S. PATENT DOCUMENTS

| | | | |
|---|---|---|---|
| 7,435,962 B2 | 10/2008 | Oon et al. | |
| 7,663,226 B2 | 2/2010 | Cho et al. | |
| 7,834,925 B2 | 11/2010 | Kim | |
| 8,222,603 B2 | 7/2012 | Lee | |
| 8,228,406 B2 | 7/2012 | Kuo et al. | |
| 8,304,727 B2 | 11/2012 | Lee et al. | |
| 8,638,342 B2 | 1/2014 | Cote et al. | |
| 2007/0201738 A1* | 8/2007 | Toda | H04N 9/045 382/144 |
| 2008/0087800 A1* | 4/2008 | Toda | H01L 27/14603 250/214 C |
| 2008/0218597 A1* | 9/2008 | Cho | H04N 5/2351 348/222.1 |
| 2011/0235017 A1* | 9/2011 | Iwasaki | H04N 5/2354 356/4.01 |
| 2011/0298933 A1* | 12/2011 | Yanowitz | H04N 5/367 348/175 |
| 2011/0298944 A1* | 12/2011 | Kuo | H04N 9/045 348/223.1 |
| 2011/0298945 A1* | 12/2011 | Chen | H04N 5/165 348/223.1 |

(Continued)

FOREIGN PATENT DOCUMENTS

| | | |
|---|---|---|
| KR | 10-0645634 B1 | 11/2006 |
| KR | 10-0902128 B1 | 6/2009 |
| KR | 10-2011-0064306 A | 6/2011 |

(Continued)

*Primary Examiner* — Justin P Misleh
(74) *Attorney, Agent, or Firm* — Volentine & Whitt, PLLC

(57) ABSTRACT

A lens shading correction method includes providing lens shading correction profile data; calculating an intensity values of light passing through each of one or more visible light pass filters and each of one or more infrared light pass filters; calculating an average of the intensity values of the light passing through the one or more visible light pass filters; calculating an average of the intensity values of the light passing through the one or more infrared light pass filters; calculating a normalized intensity value of the light passing through the one or more infrared light pass filters, based on the calculated averages; adjusting one or more lens shading correction coefficients included in the lens shading correction profile data and each having a value varying depending on a frequency element of light, based on the calculated normalized intensity value; and correcting lens shading by using the adjusted lens shading correction coefficient.

19 Claims, 12 Drawing Sheets

(56) References Cited

U.S. PATENT DOCUMENTS

| | | |
|---|---|---|
| 2012/0268426 A1 | 10/2012 | Yi et al. |
| 2014/0184813 A1* | 7/2014 | Cohen .................. H04N 5/3572 348/187 |
| 2015/0036029 A1* | 2/2015 | Theuwissen ........... H04N 9/045 348/273 |
| 2015/0124128 A1* | 5/2015 | Chen .................... H04N 5/3572 348/251 |

FOREIGN PATENT DOCUMENTS

| | | |
|---|---|---|
| KR | 10-2011-0072213 A | 6/2011 |
| KR | 10-2012-0120697 A | 11/2012 |
| KR | 10-2013-0019583 A | 2/2013 |

* cited by examiner

LENS SHADING CORRECTION METHOD AND IMAGE SIGNAL PROCESSING DEVICE AND IMAGE SENSOR SYSTEM EMPLOYING THE METHOD

CROSS-REFERENCE TO RELATED APPLICATIONS

This US non-provisional patent application claims priority under 35 USC §119 to Korean Patent Application No. 10-2013-0165544, filed on Dec. 27, 2013, the entirety of which is hereby incorporated by reference.

BACKGROUND AND SUMMARY

Embodiments of the present disclosure relate to image processing and, more particularly, to a lens shading correction method using an infrared component of light, and an image signal processing device and an image sensor system employing the method.

In recent years, digital cameras have prevailed increasingly. A digital camera includes a plurality of light pass filters to transmit light having a specific frequency component, and a plurality of photosensitive elements to sense light passing through the light pass filters. Each of the light pass filters may transmit not only a predetermined frequency component of the light but also an infrared component. In addition, the photosensitive elements sense the infrared component of the light.

An infrared component of light affects a captured image. The image affected by the infrared component of the light shows an object in a different manner from when a person sees the object through their eyes. This is because the image affected by the infrared component of the light inaccurately represents a visible-ray component of the light. That is, the image affected by the infrared component of the light has a low quality. In order to overcome this problem, an infrared cut-off filter may be combined with a rear surface of a lens.

When an image is captured by a camera, shading is caused by a lens. The lens shading is a phenomenon in which one or more photosensitive elements, from among the plurality of photosensitive elements, disposed in an edge region do not receive light sufficiently due to an optical characteristic of the lens. That is, the lens shading causes the object to be inaccurately represented in the edge region of the captured image. In order to overcome this problem, lens shading correction may be performed to compensate for signal intensity attenuation with respect to the photosensitive element(s) disposed in the edge region.

Lens shading correction may be performed based on color temperature information or white balance information. Due to an optical characteristic, a cut-off frequency of an infrared cut-off filter varies depending on a distance between a light-transmitting lens region and the center of a lens. Since intensities of infrared components of different light emitted from different light sources are different from each other, the degree of lens shading varies depending on the type of the light source. Accordingly, even when the lens shading correction is performed based on the same color temperature information or the same white balance information, the quality of the final image may vary depending on the type of the light source. That is, it is difficult to perform lens shading correction accurately.

SUMMARY OF THE INVENTION

Disclosed herein are a lens shading correction method, and an image signal processing device and an image sensor system which employ the lens shading correction method.

In one aspect, a lens shading correction method is provided. In some embodiments, the lens shading correction method may include: receiving at a photo-sensitive element array light which has passed through a lens; providing lens shading correction profile data for the lens, the lens shading correction profile data including one or more lens shading correction coefficients; calculating one or more intensity values of one or more first portions of the light passing through one or more visible light pass filters; calculating one or more intensity values of one or more second portions of the light passing through one or more infrared light pass filters; calculating an average of the intensity values of the one or more first portions of the light passing through the one or more visible light pass filters; calculating an average of the intensity values of the one or more second portions of the light passing through the one or more infrared light pass filters; calculating a normalized intensity value of the one or more second portions of the light passing through the one or more infrared light pass filters, based on the average of the intensity values of the one or more first portions of the light passing through the one or more visible light pass filters and the average of the intensity values of the one or more second portions of the light passing through the one or more infrared light pass filters; adjusting the one or more lens shading correction coefficients based on the calculated normalized intensity value of the one or more second portions of the light passing through the one or more infrared light pass filters; and correcting lens shading produced by the lens by using the one or more adjusted lens shading correction coefficients.

In some embodiments, the normalized intensity value of the one or more second portions of the light passing through the one or more infrared light pass filters may be calculated by calculating a ratio of the average of the intensity values of the one or more second portions of the light passing through the one or more infrared light pass filters to the average of the intensity values of the one or more first portions of the light passing through the one or more visible light pass filters.

In some embodiments, the one or more lens shading correction coefficients may be differently adjusted depending on a frequency component of the light.

In another aspect, an image signal processing device for lens shading correction is provided. In some embodiments, the image signal processing device may include a characteristic value calculation unit configured to calculate an intensity value of light with respect to each pixel, based on an electrical signal including information of an intensity of light passing through one or more visible light pass filters and information of an intensity of light passing through one or more infrared light pass filters; a normalization unit configured to calculate a normalized intensity value of the light passing through the one or more infrared light pass filters, based on an average of intensity values of the light passing through the one or more visible light pass filters and an average of intensity values of the light passing through the one or more infrared light pass filters; a coefficient adjustment unit configured to adjust one or more lens shading correction coefficients, included in lens shading correction profile data for the lens shading correction and each having a value varying depending on a frequency component of the light, based on the calculated normalized intensity value; and a lens shading correction unit configured to perform the lens shading correction by using the adjusted lens shading correction coefficient.

In some embodiments, the image signal processing device may further include a data storing unit configured to store the lens shading correction profile data.

In some embodiments, the normalization unit may calculate the normalized intensity value by a ratio of the average of the intensity values of the light passing through the one or more infrared light pass filters to the average of the intensity values of the light passing through the one or more visible light pass filters.

In some embodiments, the coefficient adjustment unit may differently adjust the one or more lens shading correction coefficients depending on a frequency component of light.

In yet another aspect, an image sensor system for lens shading correction is provided. In some embodiments, the image sensor system may include a filter array including one or more visible light pass filters and one or more infrared light pass filters; a photosensitive element array including a plurality of photosensitive elements, each photosensitive element generating an electrical signal based on one of an intensity of light passing through the one or more visible light pass filters and an intensity of light passing through the one or more infrared light pass filters; and an image signal processing device configured to adjust one or more lens shading correction coefficients, included in lens shading correction profile data for the lens shading correction and each having a value varying depending on a frequency component of light, based on a characteristic of the generated electric signal, and configured to perform the lens shading correction by using the adjusted lens shading correction coefficient.

In some embodiments, each of the one or more visible light pass filters may be one of a red light pass filter, a green light pass filter, and a blue light pass filter. The filter array may include a first filter unit configured such that one red light pass filter, two green light pass filters, and one blue light pass filter are disposed on pixels included in a 2×2 pixel unit, respectively; and a second filter unit configured such that at least one of the one red light pass filter, the two green light pass filters, and the one blue light pass filter disposed on the first filter unit is replaced with an infrared light pass filter. The second filter unit may be configured such that the one red light pass filter disposed on the first filter unit is replaced with the infrared light pass filter in the second filter unit.

In some embodiments, the image sensor system may further include a data storing device configured to store the lens shading correction profile data.

In some embodiments, the image signal processing device may calculate an average of intensity values of the light passing through the one or more visible light pass filters and an average of intensity values of the light passing through the one or more infrared light pass filters, based on a characteristic of the generated electrical signals; calculate a normalized intensity value of the light passing through the one or more infrared light pass filters, based on the average of the intensity values of the light passing through the one or more visible light pass filters and the average of the intensity values of the light passing through the one or more infrared light pass filters; and adjust the one or more lens shading correction coefficients based on the calculated normalized intensity value. The image signal processing device may calculate the normalized intensity value by a ratio of the average of the intensity values of the light passing through the one or more infrared light pass filters to the average of the intensity values of the light passing through the one or more visible light pass filters.

In some embodiments, the image signal processing device may adjust the one or more lens shading correction coefficients differently depending on a frequency component of the light.

In still another aspect, a system is provided. The system includes one or more data storage devices and one or more processors. The one or more data storage devices are configured to store therein lens shading correction profile data for correcting image data produced by a photosensitive element array to account for a lens shading effect produced by passing light through a lens and providing the light passed through the lens to be received by the photosensitive element array. The one or more processors are configured to: configured to: calculate first intensity values for each of a plurality of first portions of the light received by a corresponding first plurality of photosensitive elements of the photosensitive element array through a corresponding plurality of visible light pass filters, calculate second intensity values for each of a plurality of second portions of the light received by a corresponding second plurality of photosensitive elements of the photosensitive element array through a corresponding plurality of infrared light pass filters, calculate an average of the first intensity values, calculate an average of the second intensity values, calculate a normalized intensity value for the second portions of the light from the average of the first intensity values and the average of the second intensity values, and perform lens shading correction of the image data using the therein lens shading correction profile data and the normalized intensity value.

In some embodiments, the one or more data storage devices are further configured to store a plurality of look-up tables each comprising a different set of the lens shading profile data for performing lens shading correction under each of a plurality of light conditions in which infrared components having different intensities are present, and the one or more processors are configured to perform the lens shading correction of the image data by selecting one of the sets of lens shading profile data based on the normalized intensity value, and applying the selected set of lens shading profile data to the image data.

In some embodiments, the one or more data storage devices are further configured to store a plurality of look-the one or more data storage devices are further configured to store a plurality of look-up tables each comprising a different set of the lens shading profile data for performing lens shading correction under each of a plurality of light conditions in which infrared components having different intensities are present, and the one or more processors are configured to perform the lens shading correction of the image data by iterating between two of the sets of lens shading profile data based on the normalized intensity value, and applying the iterated set of lens shading profile data to the image data.

In some embodiments, the system further comprises: the photosensitive element array; and a filter array comprising the plurality of visible light pass filters and the plurality of infrared light pass filters.

In some versions of these embodiments, the filter array comprises: a plurality of 2×2 first filter units, each first filter unit comprising one red light pass filter, two green light pass filters, and one blue light pass filter; and a plurality of 2×2 second filter units, each second filter unit comprising an infrared light pass filter and at least three selected among: a red light pass filter, two green light pass filters, and a blue light pass filter.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain principles of the disclosure. In the drawings.

DETAILED DESCRIPTION

Example embodiments of the present disclosure will now be described more fully through the following exemplary embodiments related to the accompanying drawings. However, the disclosure is not limited to the following embodiments but may be embodied in other forms.

Figure 1:
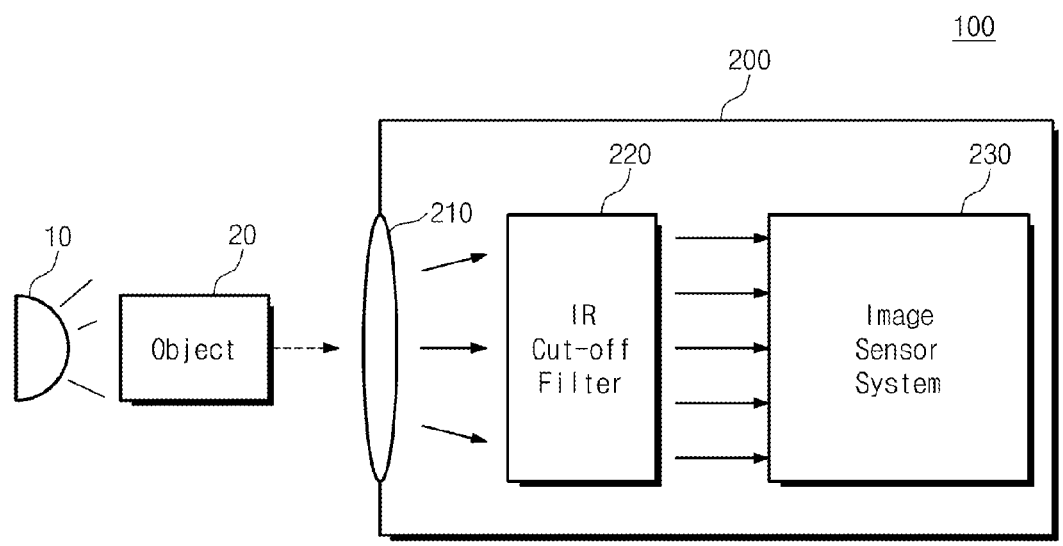
FIG. 1 is a block diagram illustrating a configuration of an image acquisition system including an image acquisition device according to an embodiment of the inventive concept.

FIG. 1 is a block diagram illustrating a configuration of an image acquisition system 100 including an image acquisition device according to an embodiment of the inventive concept. The image acquisition system 100 may comprise a light source 10, an object 20, and an image acquisition device 200.

Light source 10 emits light. Light source 10 emits not only visible light that can be seen by the naked human eye but also ultraviolet light that cannot be seen by the naked human eye. In particular, the visible light emitted from light source 10 enables object 20, which is a capturing target, to be seen. Object 20 reflects the emitted light. The reflected light is provided to image acquisition device 200.

Image acquisition device 200 may acquire an image by using the reflected light. Image acquisition device 200 may comprise a lens 210, an infrared cut-off filter 220, and an image sensor system 230.

Lens 210 may receive the reflected light. The light received by lens 210 may be provided to infrared cut-off filter 220. Infrared cut-off filter 220 may cut off an infrared component of the received light but pass the other components of the received light. However, it is substantially impossible for infrared cut-off filter 220 to cut off all infrared components of light. Some of the infrared components of the light provided to infrared cut-off filter 220 may pass through infrared cut-off filter 220 without being cut off. Moreover, an optical characteristic causes a cut-off frequency of infrared cut-off filter 220 to vary depending on a distance from the center of lens 210. That is, an infrared component of light passing through a center region of lens 210 may be different from that of light passing through an edge region of lens 210. The light passing through infrared cut-off filter 220 is provided to image sensor system 230.

Image sensor system 230 may receive the light passing through infrared cut-off filter 220. Image sensor system 230 may perform an image processing calculation to create an image by using the received light. An embodiment of image sensor system 230 will be described later with reference to FIGS. 2 to 13.

Figure 2:
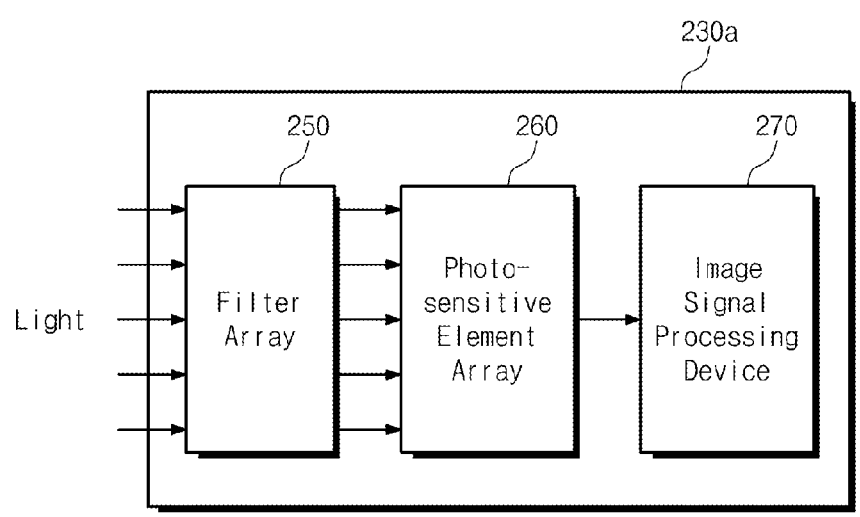
FIG. 2 is a block diagram illustrating a configuration of an image sensor system according to an embodiment of the inventive concept.

FIG. 2 is a block diagram illustrating a configuration of an image sensor system 230a according to an embodiment of the inventive concept. Image sensor system 230a may perform lens shading correction according to embodiments of the inventive concept. Image sensor system 230a may receive light passing through an infrared cut-off filter 220 (see FIG. 1). Image sensor system 230a may comprise a filter array 250, a photosensitive element array 260, and an image signal processing device 270.

Filter array 250 may receive the light passing through infrared cut-off filter 220. Filter array 250 may comprise a plurality of light pass filters. Filter array 250 may comprise one or more visible light pass filters and one or more infrared light pass filters. That is, each of the light pass filters included in filter array 250 may be a visible light pass filter or an infrared light pass filter. The light passing through infrared cut-off filter 220 may pass through the visible light pass filter or the infrared light pass filter included in filter array 250. In case of the light passing through the visible light pass filter, the intensity of visible ray components is relatively high. Further, in case of the light passing through the infrared light pass filter, the intensity of an infrared component, which is not cut off by infrared cut-off filter 220, may be relatively high.

Photosensitive element array 260 may receive the light passing through the plurality of light pass filters included in filter array 250. Photosensitive element array 260 may comprise a plurality of photosensitive elements. Each of the photosensitive elements may generate charges based on a characteristic of the received light. For example, each of the photosensitive elements may generate charges having an amount that is in proportion to the intensity of the received light. Each of the photosensitive elements may generate an electrical signal by using the generated charges. That is, each of the photosensitive elements may generate an electrical signal, based on the intensity of the light passing through the one or more visible light pass filters included in filter array 250 and the intensity of the light passing through the one or more infrared light pass filters included in filter array 250.

Image signal processing device 270 may receive the electrical signals generated by the photosensitive elements of photosensitive element array 260. Image signal processing device 270 may calculate a characteristic value (e.g., an intensity value) of light provided to each of the photosensitive elements included in photosensitive element array 260, based on a characteristic (e.g., a voltage level) of the received electrical signal. Image signal processing device 270 may perform lens shading correction for the calculated characteristic values. Image signal processing device 270 may adjust one or more lens shading correction coefficients to perform the lens shading correction. A lens shading correction coefficient is information included in lens shading correction profile data for lens shading correction. A lens shading correction coefficient may vary depending on a frequency component of light. The adjustment of one or more lens shading correction coefficients may be further described later with reference to FIGS. 8 to 13.

In particular, image sensor system 230a may perform lens shading correction by using not only a characteristic value of light passing through the visible light pass filter but also a characteristic value of light passing through the infrared light pass filter. According to embodiments of the inventive concept, the lens shading correction may be performed more accurately.

Figure 3:
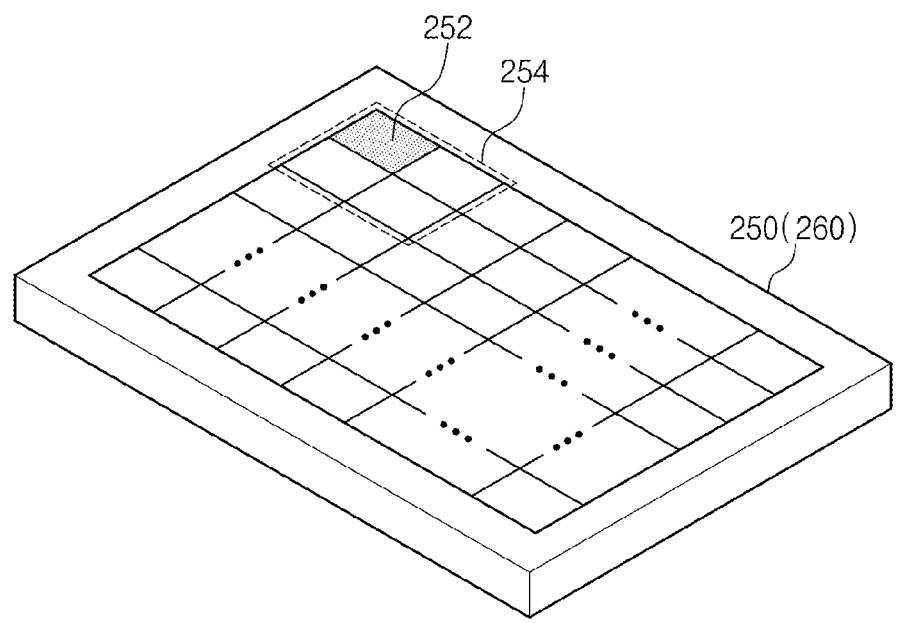
FIG. 3 is a conceptual diagram illustrating a structure of a filter array and a photosensitive element array incorporated in an embodiment of the inventive concept.

FIG. 3 is a conceptual diagram illustrating a structure of a filter array and a photosensitive element array incorporated in an embodiment of the inventive concept. A filter array 250 (see FIG. 2) and/or a photosensitive element array 260 (see FIG. 2) may be implemented by a configuration of a pixel array including a plurality of pixels 252 arranged in vertical and horizontal directions. That is, plurality of pixels 252 may constitute a pixel array.

In an exemplary embodiment of the inventive concept, the pixel array may include a 2×2 pixel unit 254. Pixel unit 254 is a conceptual unit formed by arranging two pixels 252 in a horizontal direction and arranging two pixels 252 in a vertical direction. That is, pixel unit 254 may include four pixels 252. As an exemplary embodiment, filter array 250 and photosensitive element array 260 may be implemented by the same configuration of the pixel array. In this embodiment, each of a plurality of light pass filters included in filter array 250 and each of a plurality of photosensitive elements may be in a one-to-one correspondence on a single pixel 252.

In an exemplary embodiment, a visible light pass filter included in filter array 250 may be one of a red light pass filter, a green light pass filter, and a blue light pass filter. That is, one of the red light pass filter, the green light pass filter, and the blue light pass filter may correspond to a single pixel 252. In case of light passing through the red light pass filter, the intensity of a red ray component which passes therethrough may be relatively high. In case of light passing through the green light pass filter, the intensity of a green ray component which passes therethrough may be relatively high. Similarly, in case of light passing through the blue light pass filter, the intensity of a blue ray component which passes therethrough may be relatively high. However, the visible light pass filter needs not be always implemented by a primary-color pass filter. As necessary, the visible light pass filter may be implemented by a complementary-color light pass filter, such as a magenta pass filter, a yellow pass filter, and a cyan pass filter. That is, the above embodiment does not limit the inventive concept.

Figure 4:
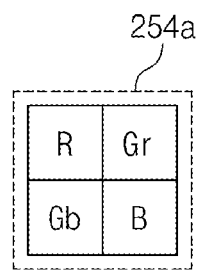
FIG. 4 is a conceptual diagram illustrating an exemplary structure of a first filter unit according to an embodiment of the inventive concept.

FIG. 4 is a conceptual diagram illustrating an exemplary structure of a first filter unit 254a according to an embodiment of the inventive concept. First filter unit 254a may be an example of filter unit 254 (see FIG. 3) that does not include an infrared light pass filter.

The visible light pass filter included in first filter unit 254a may be one of a red light pass filter, a green light pass filter, and a blue light pass filter. For instance, first filter unit 254a may include one red light pass filter R, two green light pass filters Gr and Gb, and one blue light pass filter B. The red light pass filter R, the green light pass filters Gr and Gb, and the blue light pass filter B included in first filter unit 254a may be disposed on pixels 252 (see FIG. 3) of pixel unit 254, respectively.

In an exemplary embodiment, first filter unit 254a may be configured according to a Bayer pattern. However, FIG. 4 illustrates only an exemplary configuration of first filter unit 254a. The embodiment of FIG. 4 is for better understanding of the inventive concept. To put it another way, the inventive concept is not limited to the configuration illustrated in FIG. 4.

Figure 5:
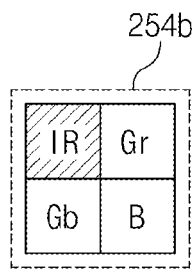
FIG. 5 is a conceptual diagram illustrating an exemplary structure of a second filter unit according to an embodiment of the inventive concept.

FIG. 5 is a conceptual diagram illustrating an exemplary structure of a second filter unit 254b according to an embodiment of the inventive concept. Second filter unit 254b may be a filter unit 254 (see FIG. 3) comprising a visible light pass filter and an infrared light pass filter.

The visible light pass filter included in second filter unit 254b may be one of a red light pass filter, a green light pass filter, and a blue light pass filter. Second filter unit 254b may be configured in such a way that one or more visible light pass filters of filter unit 254a (see FIG. 4) are replaced with an infrared light pass filter IR. That is, second filter unit 254b may comprise one or more infrared light pass filters IR.

In an exemplary embodiment, second filter unit 254b may be configured in such a way that one red light pass filter R disposed on first filter 254a is replaced with the infrared light pass filter IR. A frequency component of light passing through a red light pass filter and a frequency component of light passing through an infrared light pass filter are disposed in adjacent frequency regions. Accordingly, when the red light pass filter R is replaced with the infrared light pass filter IR, second filter unit 254b may transmit an infrared component of light while having a characteristic that is not significantly different from a characteristic of first filter unit 254a.

However, the inventive concept is not limited to the above embodiment. For instance, second filter unit 254b may be configured in such a way that one of green light pass filters Gr disposed on first filter unit 254a is replaced with the infrared light pass filter IR. In this case, it is necessary to adjust a pass band characteristic of another green light pass filter Gb. That is, first filter unit 254a and second filter unit 254b may be configured in various forms by those skilled in the art. In embodiments of the inventive concept, it is sufficient that filter unit 254 is configured such that a filter array 250 (see FIG. 2) comprises one or more infrared light pass filters IR.

Figure 6:
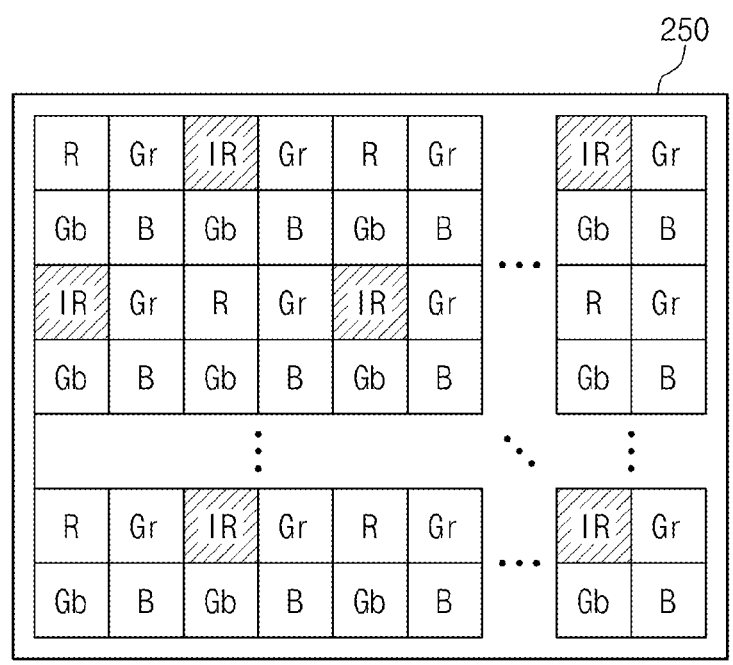
FIG. 6 is a conceptual diagram illustrating an exemplary structure of a filter array incorporated in an embodiment of the inventive concept.

FIG. 6 is a conceptual diagram illustrating an exemplary structure of a filter array 250 incorporated in an embodiment of the inventive concept. Filter array 250 may comprise a first filter unit 254a of FIG. 4 and a second filter unit 254b in FIG. 5.

As shown in FIG. 6, filter array 250 may comprise first filter units 254a and second filter units 254b that are arranged in an alternating pattern. However, the configuration of filter unit 250 shown in FIG. 6 is merely exemplary. If one or more infrared light pass filters IR are just included in filter array 250, filter array 250 may be configured in any type. Filter array 250 may further comprise a filter unit 254 (see FIG. 3) having a different configuration from first filter unit 254a and second filter unit 254b. The configuration of filter array 250 is not limited to the configuration illustrated in FIG. 6.

Filter array 250 comprising one or more infrared light pass filters IR may transmit an infrared component of light therethrough. A photosensitive element array 260 (see FIG. 2) may generate one or more electrical signals based on a characteristic (e.g., intensity) of the infrared component of the light passing through filter array 250. In addition, an image signal processing device 270 (see FIG. 2) may perform lens shading correction according to a characteristic (e.g., a voltage level) of an electrical signal generated by photosensitive element 260. That is, in an embodiment of the inventive concept, the lens shading correction may be performed by using the light passing through the infrared light pass filters.

Figure 7:
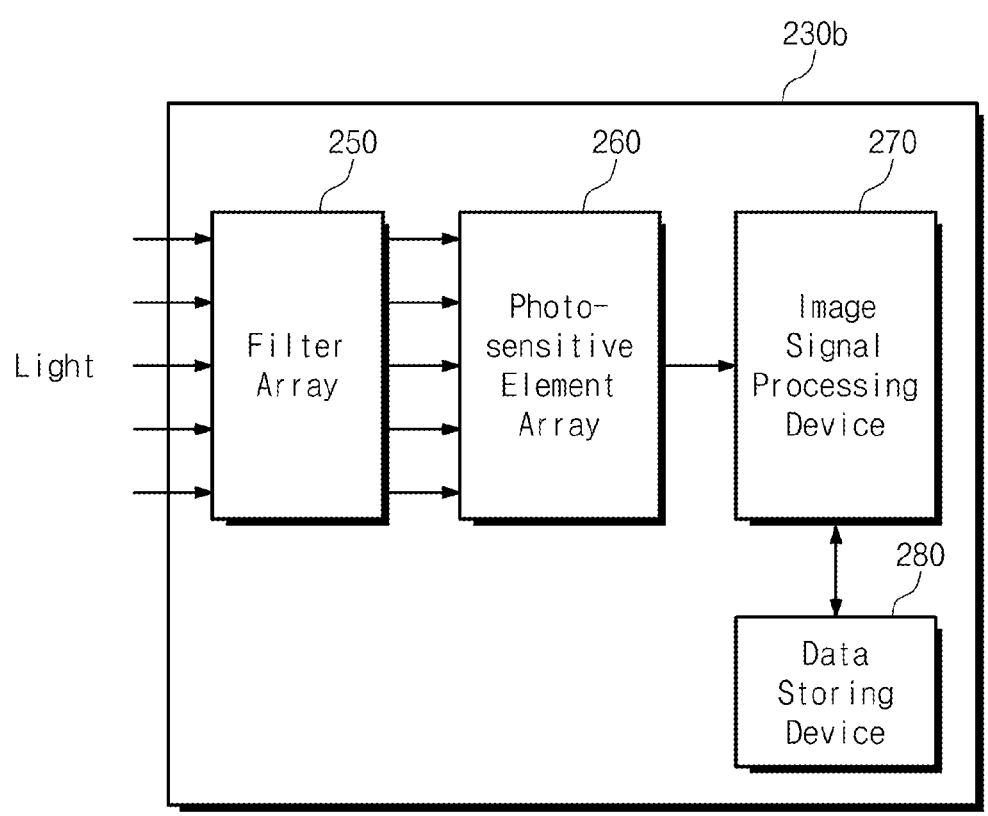
FIG. 7 is a block diagram illustrating another configuration of an image sensor system according to an embodiment of the inventive concept.

FIG. 7 is a block diagram illustrating another configuration of an image sensor system 230b according to an embodiment of the inventive concept. Image sensor system 230b may receive light passing through an infrared cut-off filter 220 (see FIG. 1). Image sensor system 230b may comprise a filter array 250, a photosensitive element array 260, an image signal processing device 270, and a data storing device 280. The configurations and functions of filter array 250, photosensitive element array 260, and image signal processing device 270 may include those of filter array 250, photosensitive element array 260, and the image signal processing device included in image sensor system 230a of FIG. 2, respectively. In order to avoid duplicated descriptions, filter array 250, photosensitive element array 260, and image signal processing device 270 will not described in further detail.

Data storing device 280 may store lens shading correction profile data for lens shading correction. The lens shading correction profile data is data with respect to a profile of the amount or degree of lens shading correction to be performed. Image signal processing device 270 may perform lens shading correction based on the lens shading correction profile data stored in data storing device 280. Image signal processing device 270 may correct lens shading as much as the amount indicated by the lens shading correction profile data.

However, since the intensities of infrared components of lights emitted from different light sources vary, the degree of lens shading varies depending on the types of a light source. Thus, to perform lens shading correction accurately, the lens shading correction profile data stored in data storing device 280 should be modified based on a characteristic (e.g., intensity) of light passing through one or more infrared light pass filters included in filter array 250. Lens shading correction may be performed more accurately by using the modified lens shading correction profile data.

As shown in FIG. 7, image signal processing device 270 and data storing device 280 included in image sensor system 230b may be implemented separately with each other. However, the inventive concept is not limited to the configuration described in FIG. 7. That is, image signal processing device 270 and data storing device 280 may be implemented together with each other in the form of a single circuit or chip.

Figure 8:
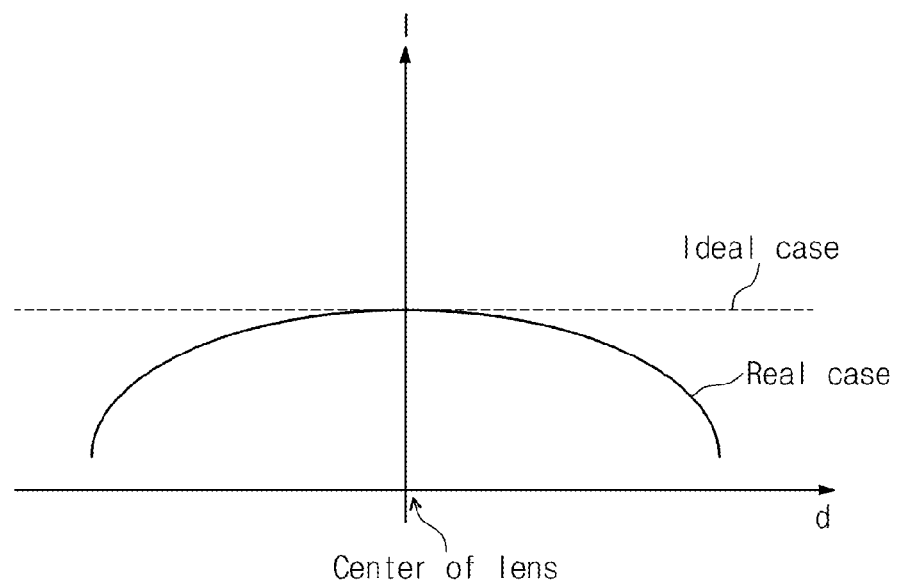
FIG. 8 is a graph for illustrating a lens shading phenomenon.

FIG. 8 is a graph for illustrating a lens shading phenomenon. In the graph, the horizontal axis represents a distance "d" from a center of a lens 210 (see FIG. 1). Further, a vertical axis represents the intensity "I" of light provided to an image sensor system 230 (see FIG. 1), 230a (see FIG. 2) or 230b (see FIG. 7). It is ideal that the intensity of light provided to image sensor system 230, 230a or 230b through the center of lens 210 is equal to the intensity of light provided to image sensor system 230, 230a or 230b through an edge region of lens 210. Namely, it is ideal that the intensity of light provided to image sensor system 230, 230a or 230b through lens 210 and an infrared cut-off filter 220 (see FIG. 1) is constant irrespective of a distance between the center of lens 210 and a region of the lens where the light passes (see the dotted line in FIG. 7).

However, in practice, due to an optical characteristic of lens 210, the intensity "I" of the light provided to image sensor system 230, 230a or 230b decreases with increasing of the distance "d" between the center of lens 210 and the region of the lens where the light passes (see the solid line in FIG. 7). If the intensity "I" of the light provided to image sensor 230, 230a or 230b decreases, the intensity of an electrical signal generated by a photosensitive element array 230 (see FIGS. 2 and 7) decreases. Accordingly, lens shading correction is performed to compensate for the signal intensity attenuation.

Figure 9:
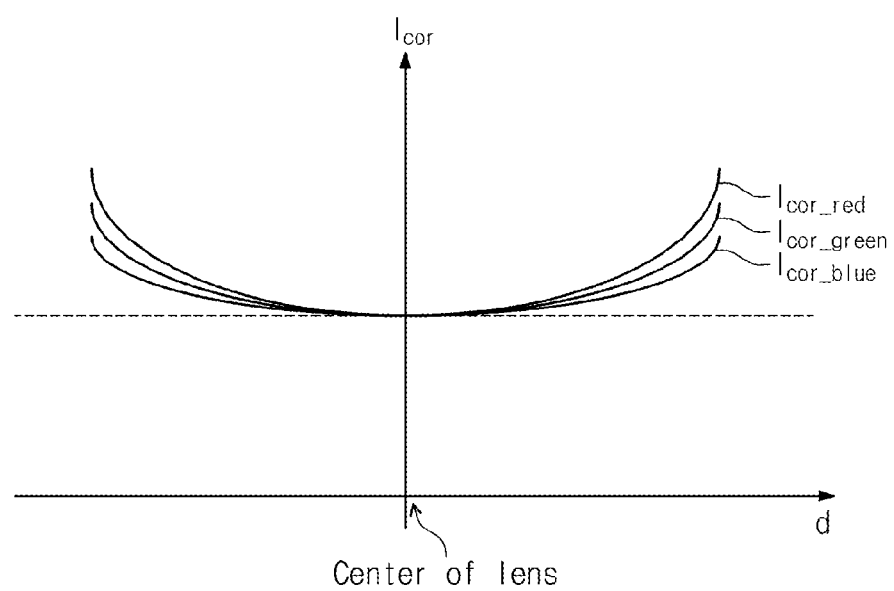
FIG. 9 is a graph for illustrating lens shading correction.

FIG. 9 is a graph for illustrating lens shading correction. In the graph, the horizontal axis represents a distance "d" from the center of a lens 210 (see FIG. 1) and a vertical axis represents the amount $I_{cor}$ of lens shading correction to be performed. As previously mentioned with reference to FIG. 8, signal intensity attenuation increases as the distance "d" from the center of lens 210 increases. Thus, the amount $I_{cor}$ of lens shading correction to be performed needs to be increased as the distance "d" from the center of lens 210 increases.

In particular, the amount of signal intensity attenuation caused by lens shading may vary depending on a frequency component of light. Thus, the amount $I_{cor}$ of lens shading correction to be performed may vary depending on the frequency component of light. As an example, a lens shading correction profile $I_{cor\_red}$ for a red component of the light, a lens shading correction profile $I_{cor\_green}$ for a green component of the light, and a lens shading correction profile $I_{cor\_blue}$ for a blue component of the light are shown in the graph in FIG. 9.

In an exemplary embodiment, a data storing device 280 (see FIG. 7) may store data with respect to the lens shading correction profile shown in FIG. 9. The lens shading correction profile data stored in data storing device 280 may comprise data for one or more lens shading correction coefficients. A lens shading correction coefficient is the amount of lens shading correction to be performed in an image region corresponding to a specific distance "d" from the center of lens 210. A lens shading correction coefficient may have a value that varies depending on a frequency component of light. Accordingly, as shown in FIG. 9, the lens shading correction profile may vary depending on the frequency component of light. An image signal processing device 270 (see FIGS. 2 and 7) may perform lens shading correction by using the lens shading correction coefficient(s).

However, in order to accurately perform lens shading correction, the lens shading correction profile data stored in data storing device 280 should be modified based on a characteristic (e.g., intensity) of light passing through one or more infrared light pass filters included in a filter array 250 (see FIGS. 2 and 7). Image signal processing device 270 may adjust the lens shading correction coefficient to modify the lens shading correction profile data. The amount the lens shading correction coefficient is to be adjusted may be calculated based on a characteristic value of light passing through a plurality of light pass filters included in filter array 250.

Image signal processing device 270 may perform lens shading correction by using the adjusted lens shading correction coefficient(s). A characteristic of light passing through one or more infrared light pass filters included in filter array 250 is being reflected in the adjusted lens shading correction coefficient(s). Thus, the lens shading correction may be performed more accurately by using the adjusted lens shading correction coefficient(s).

Figure 10:
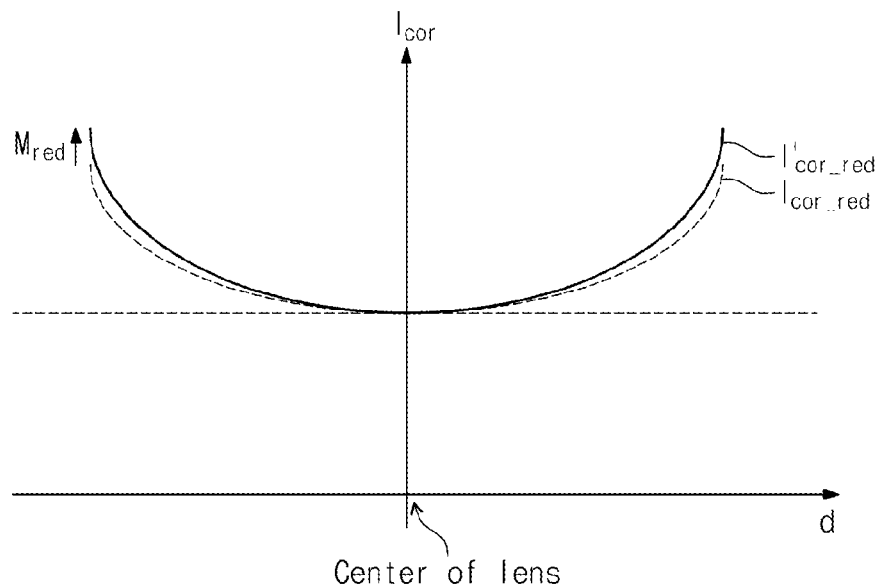
FIGS. 10 to 12 are graphs for illustrating an exemplary operation of an image sensor system according to an embodiment of the inventive concept.
Figure 11:
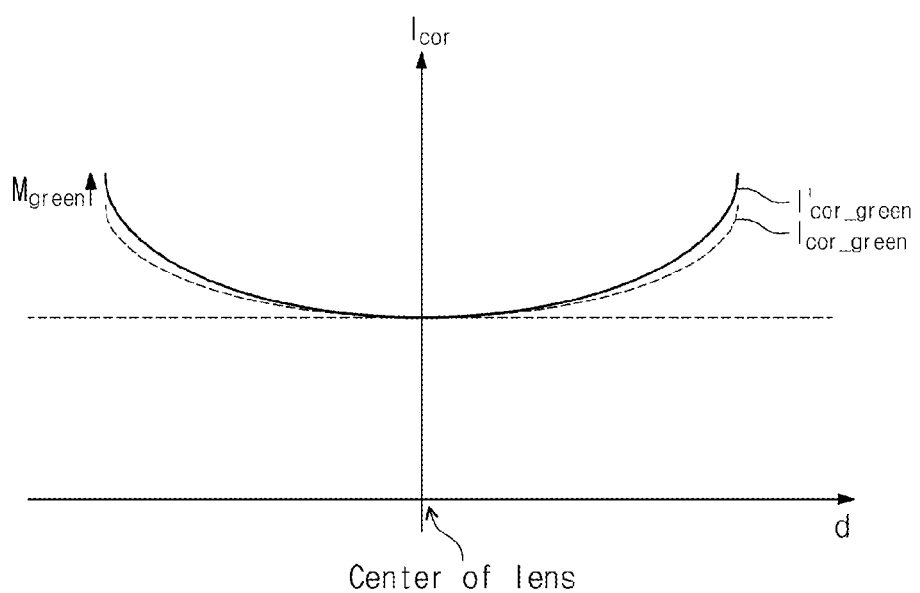
Figure 12:
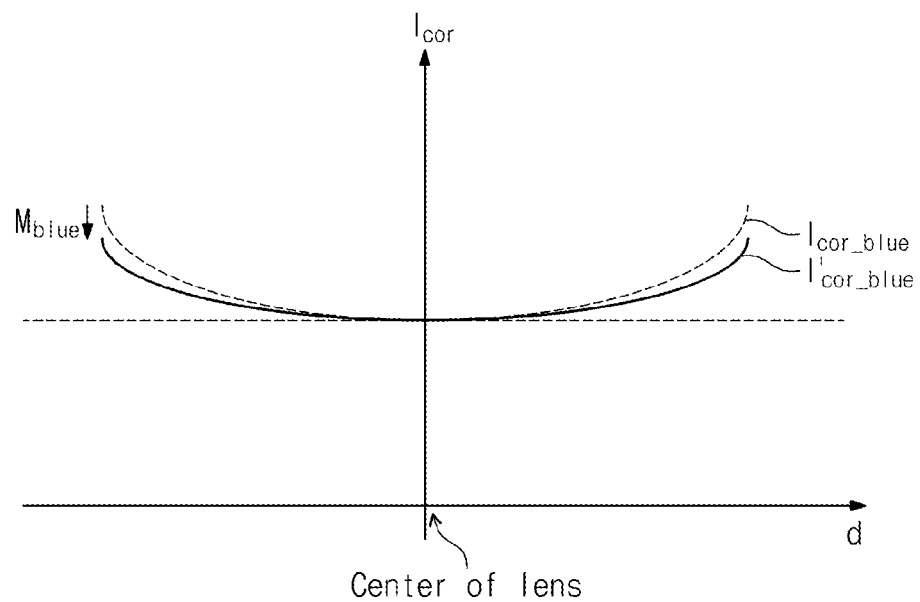

FIGS. 10 to 12 are graphs for illustrating an exemplary operation of an image sensor system according to an embodiment of the inventive concept.

In the graph of FIG. 10, a lens shading correction profile $I_{cor\_red}$ (see the dotted line in FIG. 10) for a red component of light is shown. An image signal processing device 270 (see FIGS. 2 and 7) may adjust one or more lens shading correction coefficients included in the lens shading correction profile $I_{cor\_red}$ for a red component of light. In particular, a value $M_{red}$ with respect to the amount the lens shading correction coefficient(s) is/are to be adjusted may be calculated based on a characteristic (e.g., intensity) of light passing through one or more infrared light pass filters included in a filter array 250 (see FIGS. 2 and 7). One or more adjusted lens shading correction coefficients may form a modified lens shading correction profile I'$_{cor\_red}$ (see the solid line in FIG. 10). Image signal processing device 270 may perform lens shading correction by using the modified lens shading correction profile I'$_{cor\_red}$.

In the graph of FIG. 11, a lens shading correction profile I$_{cor\_green}$ (see the dotted line in FIG. 11) for a green component of light is shown. Image signal processing device 270 may adjust one or more lens shading correction coefficients included in the lens shading correction profile I$_{cor\_green}$ for a green component of light. In particular, a value M$_{green}$ with respect to the amount the lens shading correction coefficient(s) is/are to be adjusted may be calculated based on a characteristic of light passing through one or more infrared light pass filters included in filter array 250. One or more adjusted lens shading correction coefficients may form a modified lens shading correction profile I'$_{cor\_green}$ (see the solid line in FIG. 11). Image signal processing device 270 may perform lens shading correction by using the modified lens shading correction profile I'$_{cor\_green}$.

In the graph of FIG. 12, a lens shading correction profile I$_{cor\_blue}$ (see the dotted line in FIG. 12) for a blue component of light is shown. Image signal processing device 270 may adjust one or more lens shading correction coefficients included in the lens shading correction profile I$_{cor\_blue}$ for a blue ray component of light. In particular, a value M$_{blue}$ with respect to the amount of lens shading correction coefficient(s) is/are to be adjusted may be calculated based on a characteristic of light passing through one or more infrared light pass filters included in filter array 250. One or more adjusted lens shading correction coefficients may form a modified lens shading correction profile I'$_{cor\_blue}$ (see the solid line in FIG. 12). Image signal processing device 270 may perform lens shading correction using the modified lens shading correction profile I'$_{cor\_blue}$.

In FIGS. 10 to 12, the values M$_{red}$, M$_{green}$, and M$_{blue}$ may be different from one another. That is, image signal processing device 270 may differently adjust a lens shading correction coefficient depending on a frequency component of light that is a target of the lens shading correction. This is because an influence caused by an infrared component of light may vary depending on the frequency component of light. However, in FIGS. 10 to 12, directions and magnitudes of the lens shading correction profiles I$_{cor\_red}$, I$_{cor\_green}$, and I$_{cor\_blue}$ to be modified by the values M$_{red}$, M$_{green}$, and M$_{blue}$, respectively, are merely exemplary for better understanding of the inventive concept. That is, the inventive concept is not limited to the contents described with reference to FIGS. 10 to 12.

Figure 13:
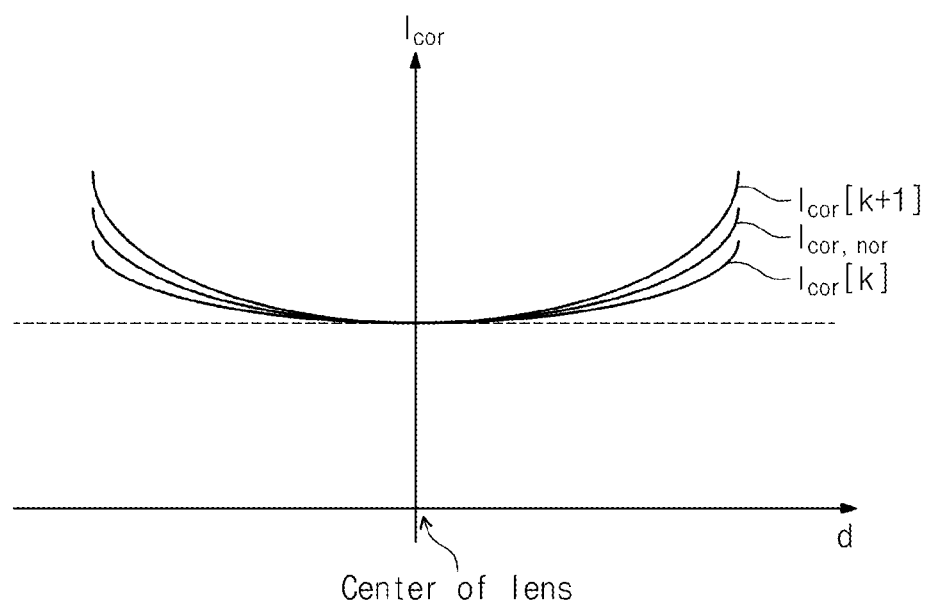
FIG. 13 is a graph for illustrating an embodiment to calculate an adjusted value of a lens shading correction coefficient.

FIG. 13 is a graph for illustrating an embodiment to calculate an adjusted value of a lens shading correction coefficient.

A data storage device 280 (see FIG. 7) may store lens shading correction profile data. In an exemplary embodiment, the lens shading correction profile data may be stored in a form of N look-up tables. However, this is merely exemplary for better understanding of the inventive concept and the inventive concept is not limited to embodiments below. Each of the N look-up tables may comprise lens shading profile data for performing lens shading correction under each of a plurality of light conditions in which infrared components having different intensities are present.

That is, a first look-up table may comprise first lens shading profile data for performing lens shading correction under a light condition in which an infrared component having a first intensity is present. A second look-up table may comprise second lens shading profile data for performing lens shading correction under a light condition in which an infrared component having a second intensity, which is different from the first intensity, is present. In an exemplary embodiment, the N look-up tables may be prepared in advance by capturing images under each of a plurality of light conditions in which N infrared components having different intensities than each other are present, and analyzing the captured images.

An image signal processing device 270 (see FIG. 7) may calculate an average of intensity values of light passing through one or more visible light pass filters included in a filter array 250 (see FIG. 7), based on the intensities of light passing through each of one or more visible light pass filters. In addition, image signal processing device 270 may calculate an average of intensity values of light passing through one or more infrared light pass filters included in filter array 250, based on the intensities of light passing through each of one or more infrared light pass filters. Image signal processing device 270 may calculate a normalized intensity value of the light passing through one or more infrared light pass filters, based on the average of the intensity values of the light passing through one or more visible light pass filters and the average of the intensity values of the light passing through one or more infrared light pass filters. As an exemplary embodiment, the normalized intensity value of light passing through one or more infrared light pass filters may be calculated by the Equation (1) below.

$$IR_{nor} = \frac{IR_{avg}}{RGB_{avg}} \qquad \text{Equation (1)}$$

In the equation (1) above, IR$_{nor}$ represents a normalized intensity value of light passing through one or more infrared light pass filters, IR$_{avg}$ represents an average of intensity values of light passing through one or more infrared light pass filters, and RGB$_{avg}$ represents an average of intensity values of light passing through one or more visible light pass filters.

That is, the normalized intensity value of light passing through one or more infrared light pass filters may be calculated by calculating a ratio of the average of the intensity values of light passing through one or more infrared light pass filters to the average of the intensity values of light passing through one or more visible light pass filters. However, this is merely exemplary and the normalized intensity value of light passing through one or more infrared light pass filters may be defined and calculated in various forms.

Image signal processing device 270 may receive information of the N look-up tables from data storing device 280. In embodiments of the inventive concept, each of the N look-up tables may comprise lens shading profile data for performing lens shading correction under each of a plurality of light conditions in which infrared components having different intensities are present. Image signal processing device 270 may adjust one or more lens shading correction coefficients based on the normalized intensity value.

As an exemplary embodiment, image signal processing device 270 may search intensity values forming an interval to which a normalized intensity value of light passing through one or more infrared light pass filters belongs, from among intensity values of infrared components respectively corresponding to the N look-up tables. For example, let it be assumed that a first look-up table includes information of lens shading profile data for performing lens shading correction under a light condition in which an infrared component having an intensity value of 1 is present. Let it be assumed that a second look-up table includes information of lens shading profile data for performing lens shading correction under a light condition in which an infrared component having an intensity value of 2 is present. Let it be assumed that a third look-up table includes information of lens shading profile data for performing lens shading correction under a light condition in which an infrared component having an intensity value of 3 is present. Furthermore, let it be assumed that a normalized intensity value of light passing through one or more infrared light pass filters is 2.7.

In the above example, image processing device 270 may determine whether the normalized intensity value of light passing through one or more infrared light pass filters (i.e., 2.7) belongs to an interval formed by the intensity value corresponding to the first look-up table (i.e., 1) and the intensity value corresponding to the second look-up table (i.e., 2). However, since the intensity value 2.7 does not belong to the interval formed by "1" and "2", image signal processing device 270 may perform the next search. Image signal processing device 270 may determine Whether the normalized intensity value (i.e., 2.7) belongs to an interval formed by the intensity value corresponding to the second look-up table (i.e., 2) and the intensity value corresponding to the third look-up table (i.e., 3). Since the intensity value 2.7 belongs to the interval formed by "2" and "3", image signal processing device 270 may terminate the search. That is, generally, image signal processing device 270 may search an intensity value corresponding to a $k^{th}$ look-up table and an intensity value corresponding to a $(k+1)^{th}$ look-up table that form an interval to which the normalized intensity value of light passing through one or more infrared light pass filters belongs.

When the normalized intensity value of light passing through one or more infrared light pass filters is equal to the intensity value corresponding to the $k^{th}$ look-up table, it is sufficient that the lens shading correction is performed based on lens shading correction profile data of the $k^{th}$ look-up table. However, when the normalized intensity value belongs to an interval formed by the intensity value corresponding to the $k^{th}$ look-up table and the intensity value corresponding to the $(k+1)^{th}$ look-up table, lens shading correction profile data should be modified to perform lens shading correction more accurately. In an exemplary embodiment, the modified lens shading correction profile may be obtained by Equation (2) below.

$$I_{cor,nor} = (1-w) \cdot I_{cor}[k] + w \cdot I_{cor}[k+1]$$ Equation (2)

In equation (2), $I_{cor}[k]$ represents a lens shading correction profile corresponding to the $k^{th}$ look-up table, and $I_{cor}[k+1]$ represents a lens shading correction profile corresponding to the $(k+1)^{th}$ look-up table. Furthermore, w may be defined according to Equation (3) below.

$$w = \frac{IR_{nor} - IR[k]}{IR[k+1] - IR[k]}$$ Equation (3)

In equation (3), IR[k] represents an intensity value corresponding to the $k^{th}$ look-up table, and IR[k+1] represents an intensity value corresponding to the $(k+1)^{th}$ look-up table.

As shown in FIG. 13, a lens shading correction profile $I_{cor,nor}$, which is for correcting lens shading under a light condition in which an infrared component corresponding to the normalized intensity value is present, may be obtained by using Equations (2) and (3), based on the lens shading correction profile $I_{cor}[k]$ corresponding to the $k^{th}$ look-up table and the lens shading correction profile $I_{cor}[k+1]$ corresponding to the $(k+1)^{th}$ look-up table. Image signal processing device 270 may adjust one or more lens shading correction coefficients forming lens shading correction data, based on the lens shading correction profile $I_{cor,nor}$ obtained by using the Equation (2) and (3). Image signal processing device 270 may perform lens shading correction more accurately, based on modified lens shading correction profile data formed by one or more adjusted lens shading correction coefficients.

However, the above description is merely exemplary to implement the inventive concept. It is apparent that the inventive concept may be implemented through another calculation or another method.

Figure 14:
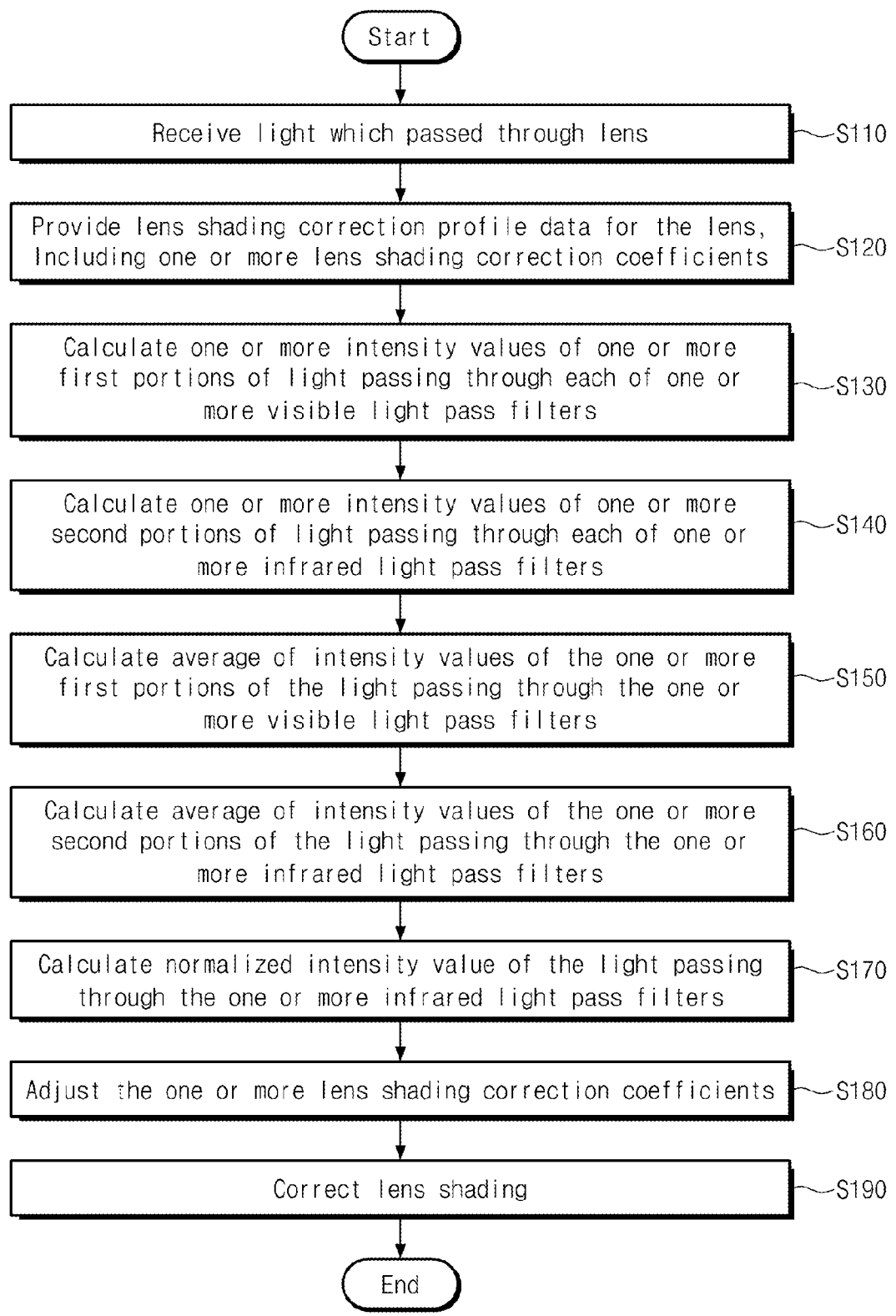
FIG. 14 is a flowchart illustrating a lens shading correction method according to another embodiment of the inventive concept.

FIG. 14 is a flowchart illustrating a lens shading correction method according to another embodiment of the inventive concept. By using the lens shading correction method, lens shading correction may be performed based on a characteristic of light passing through one or more infrared light pass filters.

At S110, photo-sensitive element array 260 (see FIG. 1) receives light which has passed through lens 210 (see FIG. 1). As mentioned above, shading is caused by lens 210, and this shading should be corrected to provide a more accurate image.

At S120, lens shading correction profile data may be provided, for example provided to a processor or processor's memory from a storage device. As mentioned above, the lens shading correction profile data is data with respect to a profile of the amount of lens shading to be corrected. The lens shading may be corrected as much as the amount indicated by the lens shading correction profile data. However, in order to perform the lens shading correction more accurately, a characteristic (e.g., intensity) of light passing through one or more infrared light pass filters should be reflected in the lens shading correction profile data. When S110 and S120 are performed, they do not have an influence on one another. Therefore the sequence of performing S110 and S120 is interchangeable.

At S130, one or more characteristic values (e.g., intensity values) of one or more first portions of the light passing through one or more visible light pass filters may be calculated. At S140, one or more characteristic values (e.g., intensity values) of one or more second portions of the light passing through one or more infrared light pass filters may be calculated. When S120, S130 and S140 are performed, they do not have an influence on one another. Therefore, the sequence of performing S120, S130 and S140 is interchangeable. That is, the description in FIG. 14 is merely exemplary for better understanding of the inventive concept.

At S150, an average of the characteristic values (e.g., intensity values) of the one or more first portions of the light passing through the one or more visible light pass filters obtained at S120 may be calculated. At S160, an average of the characteristic values (e.g., intensity values) of the one or more second portions of the light passing through the one or more infrared light pass filters obtained at S130 may be calculated. When S150 and S1650 are performed, they do not have an influence on each other. Therefore, the sequence of performing S150 and S160 is interchangeable.

At S170, a normalized characteristic value (e.g., a normalized intensity value) of the one or more second portions of the light passing through the one or more infrared light pass filters may be calculated. The normalized characteristic value of the one or more second portions of the light passing through the one or more infrared light pass filters may be calculated based on the average of the characteristic values of the one or more first portions of the light passing through the one or more visible light pass filters obtained at S150, and the average of the characteristic values of the one or more second portions of the light passing through the one or more infrared light pass filters obtained at S160. In an exemplary embodiment, the normalized characteristic value of the light passing through the one or more infrared light pass filters may be calculated by a ratio of the average of the characteristic values of the one or more second portions of the light passing through the one or more infrared light pass filters to the average of the characteristic values of the one or more first portions of the light passing through the one or more visible light pass filters. This embodiment is described above with reference to FIG. 13.

At S180, one or more lens shading correction coefficients may be adjusted. The one or more lens shading correction coefficients may included in lens shading correction profile data. In an exemplary embodiment, the lens shading correction profile data may be stored in data storing device 280 (see FIG. 7). The one or more lens shading correction coefficients may have values that vary depending on a frequency component of light. The one or more lens shading correction coefficients may be adjusted based on the normalized characteristic value (e.g., a normalized intensity value) of the one or more second portions of the light passing through the one or more infrared light pass filters obtained at S170. In an exemplary embodiment, as mentioned with reference to FIGS. 10 to 12, the amount of lens shading correction coefficient to be adjusted may be differently calculated depending on a frequency component of light. This is because an influence caused by an infrared component of the light varies depending on a frequency component of light. The adjustment of the lens shading correction coefficient(s) is described above with reference to FIG. 13. In an exemplary embodiment, the adjusted one or more lens shading correction coefficients may be stored in data storing device 280 (see FIG. 7).

At S190, lens shading may be corrected. The lens shading may be corrected by using the lens shading correction coefficient(s) adjusted at S180. The characteristic of the light passing through one or more infrared light pass filters is being reflected in the adjusted lens shading correction coefficient. Thus, the lens shading may be corrected more accurately by using the adjusted lens shading correction coefficient(s).

Figure 15:
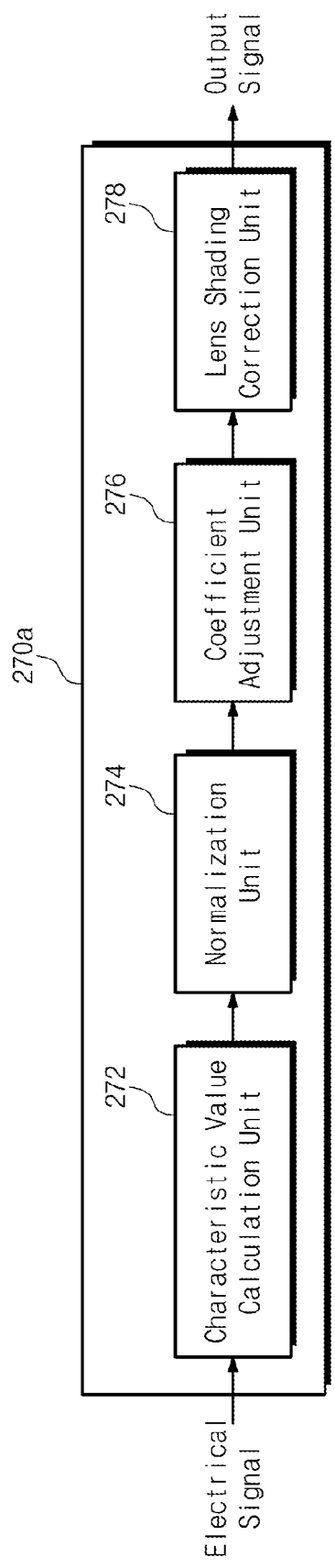
FIGS. 15 and 16 are block diagrams illustrating a configuration of an image signal processing device according to another embodiment of the inventive concept.

FIG. 15 is a block diagram illustrating a configuration of an image signal processing device 270a according to another embodiment of the inventive concept. Image signal processing device 270a may perform lens shading correction by using a characteristic of light passing through one or more infrared light pass filters. Image signal processing device 270a may comprise a characteristic value calculation unit 272, a normalization unit 274, a coefficient adjustment unit 276, and a lens shading correction unit 278.

Characteristic value calculation unit 272 may receive one or more electrical signals generated in a photosensitive element array 260 (see FIGS. 2 and 7). The electrical signal(s) may comprise information of a characteristic (e.g., intensity) of light passing through one or more visible light pass filters. In addition, the electrical signal(s) may comprise information of a characteristic (e.g., intensity) of light passing through one or more infrared light pass filters. Characteristic value calculation unit 272 may calculate a characteristic value of light with respect to each pixel, based on the received electrical signal(s). For example, characteristic value calculation unit 272 may calculate intensity values of light, based on an electrical signal including information of the intensity of the light. Characteristic value calculation unit 272 may calculate an average of the characteristic values of the light passing through one or more visible light pass filters. In addition, characteristic value calculation unit 272 may calculate an average of the characteristic values of the light passing through one or more infrared light pass filters.

Normalization unit 274 may calculate a normalized characteristic value (e.g., a normalized intensity value) of the light passing through one or more infrared light pass filters. The normalized characteristic value may be calculated based on the average of the characteristic value(s) of the light passing through one or more visible light pass filters and the average of the characteristic value(s) of the light passing through one or more infrared light pass filters. In an exemplary embodiment, the normalized characteristic value may be calculated by a ratio of the average of the characteristics value(s) of the light passing through one or more infrared light pass filters to the average of the characteristic value(s) of the light passing through one or more visible light pass filters. This embodiment is described above with reference to FIG. 13.

Coefficient adjustment unit 276 may adjust one or more lens shading correction coefficients. The one or more lens shading correction coefficients may be included in lens shading correction profile data. The one or more lens shading correction coefficients may have values that vary depending on a frequency component of light. The one or more lens shading correction coefficients may be adjusted based on the normalized characteristic value (e.g., a normalized intensity value) calculated by normalization unit 274. In an exemplary embodiment, as described with reference to FIGS. 10 to 12, the amount by which a lens shading correction coefficient is to be adjusted may be differently calculated depending on a frequency component of light. This is because an influence caused by an infrared component of light varies depending on a frequency component of light. The adjustment of the lens shading correction coefficient(s) is described above with reference to FIG. 13.

Lens shading correction unit 278 may perform lens shading correction by using the adjusted lens shading correction coefficient(s) produced by coefficient adjustment unit 276. A characteristic of the light passing through one or more infrared light pass filters is being reflected in the adjusted lens shading correction coefficient. Thus, the lens shading may be corrected more accurately by using the adjusted lens shading correction coefficient(s). That is, according to embodiments of the inventive concept, lens shading correction may be performed in consideration with the characteristic of an infrared component of light. Thus, according to embodiments of the inventive concept, the lens shading correction may be performed more accurately irrespective of types of light sources.

Figure 16:
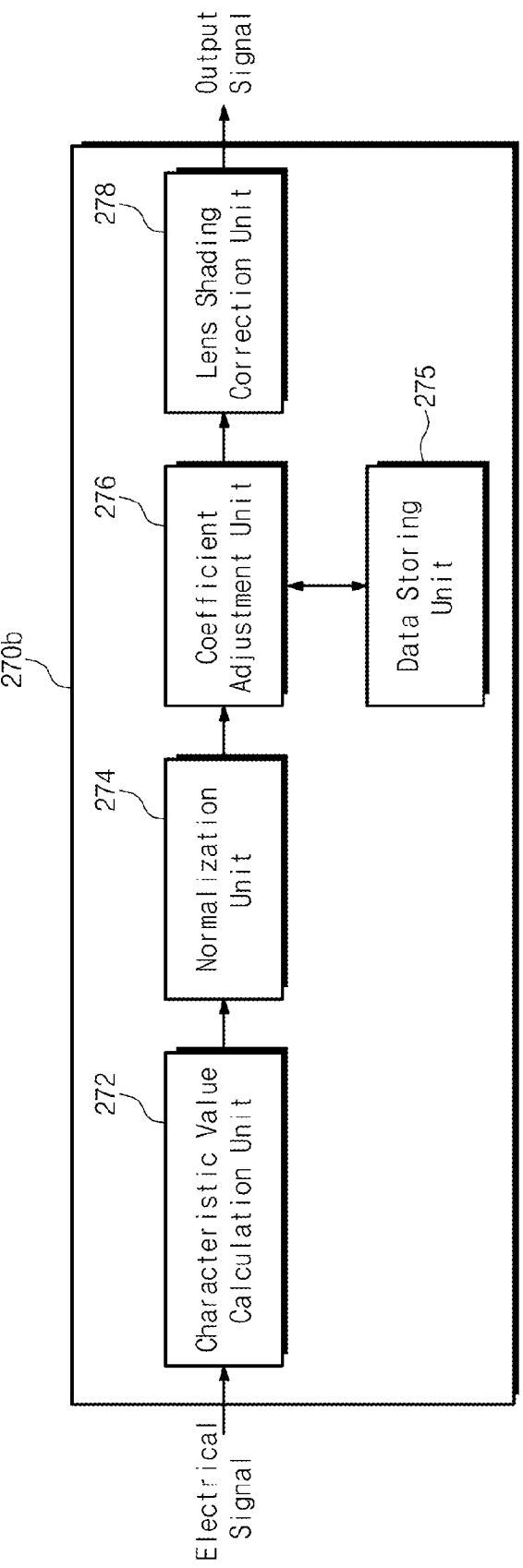

FIG. 16 is a block diagram illustrating a configuration of an image signal processing device 270b according to another embodiment of the inventive concept. Image signal processing device 270b may comprise a characteristic value calculation unit 272, a normalization unit 274, a data storing unit 275, a coefficient adjustment unit 276, and a lens shading correction unit 278. The structures and functions of characteristic value calculation unit 272, normalization unit 274, coefficient adjustment unit 276, and lens shading correction unit 278 may include those of characteristic value calculation unit 272, normalization unit 274, coefficient adjustment unit 276, and lens shading correction unit 278 of FIG. 15, respectively. Therefore, characteristic value calculation unit 272, normalization unit 274, coefficient adjustment unit 276, and lens shading correction unit 278 will not be describe in further detail to avoid duplicated descriptions.

Data storing unit 275 may store lens shading correction profile data for performing lens shading correction. As mentioned above, the lens shading profile data is data with respect to a profile of the amount of lens shading correction to be performed. Image signal processing device 270b may perform lens shading correction based on the lens shading correction profile data stored in data storing unit 275. Image signal processing device 270b may perform the lens shading correction to the extent indicated by the lens shading correction profile data.

However, since intensities of infrared component of lights emitted from different light sources are different from each other, the degree of lens shading varies depending on the type of a light source. Thus, to perform lens shading correction accurately, the lens shading correction profile data stored in data storing device 275 should be modified based on a characteristic of light passing through one or more infrared light pass filters. Lens shading correction may be performed more accurately by using the modified lens shading correction profile data.

Figure 17:
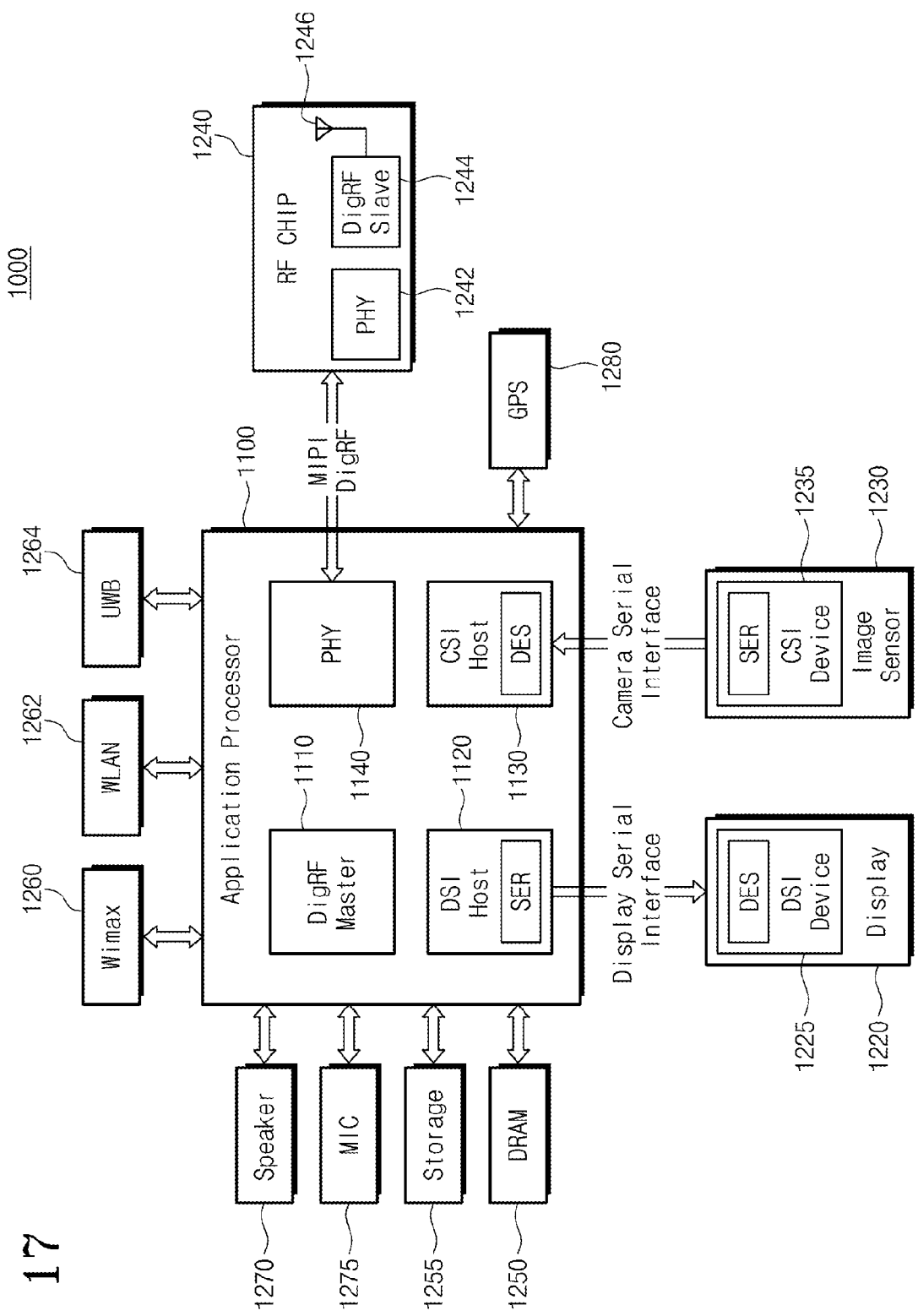
FIG. 17 is a block diagram illustrating a configuration and an interface of an electronic system including an image signal processing device according to an embodiment of the inventive concept.

FIG. 17 is a block diagram illustrating a configuration and an interface of an electronic system 1000 comprising an image signal processing device according to an embodiment of the inventive concept. Electronic system 1000 may be implemented with a data processing device capable of using or supporting a mobile industry processor interface (MIPI) interface. For example, electronic system 1000 may be implemented in the form of a portable communication terminal, a personal digital assistant (PDA), a portable multimedia player (PMP), a smartphone, etc.

Electronic system 1000 may include an application processor 1100, a display 1220, and an image sensor 1230. Application processor 1100 may include a digital radio-frequency (DigRF) master 1110, a display serial interface (DSI) host 1120, a camera serial interface (CSI) host 1130, and a physical layer (PHY) 1140.

DSI host 1120 may communicate with a DSI device 1225 of display 1220 via a display serial interface (DSI). For example, an optical serializer SER may be implemented in DSI host 1120. For example, an optical deserializer DES may be implemented in DSI device 1225.

CSI host 1130 may communicate with a CSI device 1235 of image sensor 1230 via a camera serial interface (CSI). In an exemplary embodiment, the configuration and function of CSI host 1130 may include a configuration and function according to embodiments of the inventive concept. In particular, CSI host 1130 may perform lens shading correction by using a characteristic of visible light and infrared light components of light received from image sensor 1230. Alternatively, the configuration and function of image sensor 1230 may include the configuration and function according to embodiments of the inventive concept. That is, image sensor 1230 may comprise a filter array comprising one or more visible light and infrared light pass filters. Image sensor 1230 may perform lens shading correction by using the characteristic of the visible light and infrared light components of the received light. Furthermore, an optical deserializer DES may be implemented in CSI host 1130, and an optical serializer SER may be implemented in CSI device 1235.

Electronic system 1000 may further comprise an RF chip 1240 communicating with application processor 1100. RF chip 1240 may comprise a PHY 1242, a digital radio-frequency (DigRF) slave 1244, and an antenna 1246. For example, PHY 1242 of RF chip 1240 and PHY 1140 of application processor 1100 may exchange data according to a mobile industry processor interface—digital radio-frequency (MIPI DigRF).

Electronic system 1000 may further comprise a DRAM 1250 and a storage 1255. DRAM 1250 and storage 1255 may store data received from application processor 1100. In addition, DRAM 1250 and storage 1255 may provide stored data to application processor 1100.

For example, electronic system 1000 may communicate with an external system (not shown) through a Wimax interface 1260, a wireless local area network (WLAN) interface 1262, and an ultra wideband (UWB) interface 1264. Electronic system 1000 may further comprise a speaker 1270 and a microphone (MIC) 1275 to process audio information. Electronic system 1000 may further comprise a Global Positioning System (GPS) device 1280 to process position or location information.

The device configuration shown in each block diagram is provided to understand the inventive concept. Each block may include sub-blocks according to functions. Alternatively, a plurality of blocks may constitute a larger-unit of a block. That is, the inventive concept is not limited to the configuration shown in each block diagram.

As described above, lens shading correction may be performed in consideration with a characteristic of an infrared component of light. Thus, the lens shading correction may be performed more accurately irrespective of different types of light sources.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims. For example, it is possible to adjust the driving capability of a sub word line driver or adjust the slope of level of applied driving signals by changing, adding, or removing the circuit configuration or arrangement in the drawings without departing from the technical spirit of the present disclosure in other cases.

What is claimed is:

1. A method comprising:
receiving, at a photo-sensitive element array, light which has passed through a lens;
providing lens shading correction profile data for the lens, the lens shading correction profile data including one or more lens shading correction coefficients;
calculating one or more intensity values of one or more first portions of light passing through one or more visible light pass filters;
calculating one or more intensity values of one or more second portions of light passing through one or more infrared light pass filters;
calculating an average of the one or more intensity values of the one or more first portions of the light passing through the one or more visible light pass filters;
calculating an average of the one or more intensity values of the one or more second portions of the light passing through the one or more infrared light pass filters;
calculating a normalized intensity value of the one or more second portions of the light passing through the one or more infrared light pass filters, based on the average of the one or more intensity values of the one or more first portions of the light passing through the one or more visible light pass filters and the average of the one or more intensity values of the one or more second portions of the light passing through the one or more infrared light pass filters;
adjusting the one or more lens shading correction coefficients based on the calculated normalized intensity value of the one or more second portions of the light passing through the one or more infrared light pass filters; and
correcting lens shading produced by the lens by using the one or more adjusted lens shading correction coefficients.

2. The method of claim 1, wherein the normalized intensity value of the one or more second portions of the light passing through the one or more infrared light pass filters is calculated by calculating a ratio of the average of the one or more intensity values of the one or more second portions of the light passing through the one or more infrared light pass filters to the average of the one or more intensity values of the one or more first portions of the light passing through the one or more visible light pass filters.

3. The method of claim 1, wherein the one or more lens shading correction coefficients are adjusted differently depending on a frequency component of the light.

4. An image sensor system, comprising:
a filter array comprising one or more visible light pass filters and one or more infrared light pass filters;
a photosensitive element array comprising a plurality of photosensitive elements, each photosensitive element generating an electrical signal based on an intensity of light passing through the one or more visible light pass filters and an intensity of light passing through the one or more infrared light pass filters; and
an image signal processing device configured to adjust one or more lens shading correction coefficients included in lens shading correction profile data for lens shading correction and each of the one or more lens shading correction coefficients having a value varying depending on a frequency component of light, based on a characteristic of the generated electric signals, and configured to perform the lens shading correction by using the adjusted one or more lens shading correction coefficient.

5. The image sensor system of claim 4, wherein each of the one or more visible light pass filters is one of a red light pass filter, a green light pass filter, and a blue light pass filter.

6. The image sensor system of claim 5, wherein the filter array comprises:
a first filter unit configured such that one red light pass filter, two green light pass filters, and one blue light pass filter are disposed on pixels included in a 2×2 pixel unit, respectively; and
a second filter unit configured such that at least one of the one red light pass filter, the two green light pass filters, and the one blue light pass filter of the first filter unit is replaced with an infrared light pass filter.

7. The image sensor system of claim 6, wherein the second filter unit is configured such that the one red light pass filter of the first filter unit is replaced with the infrared light pass filter in the second filter unit.

8. The image sensor system of claim 4, further comprising:
a data storing device configured to store the lens shading correction profile data.

9. The image sensor system of claim 4, wherein the image signal processing device is configured to:
calculate an average of intensity values of the light passing through the one or more visible light pass filters and an average of intensity values of the light passing through the one or more infrared light pass filters, based on the characteristic of the generated electrical signals;
calculate a normalized intensity value of the light passing through the one or more infrared light pass filters, based on the average of the intensity values of the light passing through the one or more visible light pass filters and the average of the intensity values of the light passing through the one or more infrared light pass filters; and
adjust the one or more lens shading correction coefficients based on the calculated normalized intensity value.

10. The image sensor system of claim 9, wherein the image signal processing device is configured to calculate the normalized intensity value by a ratio of the average of the intensity values of the light passing through the one or more infrared light pass filters to the average of the intensity values of the light passing through the one or more visible light pass filters.

11. The image sensor system of claim 4, wherein the image signal processing device is configured to adjust the one or more lens shading correction coefficients differently depending on the frequency component of light.

12. The image sensor system of claim 4, wherein the image signal processing device comprises:
a characteristic value calculation unit configured to calculate an intensity value of the light with respect to each photosensitive element, based on information of the intensity of the light passing through the one or more visible light pass filters and information of the intensity of the light passing through the one or more infrared light pass filters;
a normalization unit configured to calculate a normalized intensity value of the light passing through the one or more infrared light pass filters, based on an average of the intensity values of the light passing through the one or more visible light pass filters and an average of the intensity values of the light passing through the one or more infrared light pass filters;
a coefficient adjustment unit configured to adjust the one or more lens shading correction coefficients included in the lens shading correction profile data for the lens shading correction and each having a value varying depending on the frequency component of the light, based on the calculated normalized intensity value of the light passing through the one or more infrared light pass filters; and
a lens shading correction unit configured to perform the lens shading correction by using the adjusted lens shading correction coefficient.

13. The image sensor system of claim 12, further comprising:
a data storing unit configured to store the lens shading correction profile data.

14. The image sensor system of claim 12, wherein the normalization unit is configured to calculate the normalized intensity value by a ratio of the average of the intensity values of the light passing through the one or more infrared light pass filters to the average of the intensity values of the light passing through the one or more visible light pass filters.

15. The image sensor system of claim 12, wherein the coefficient adjustment unit is configured to adjust the one or more lens shading correction coefficients differently depending on the frequency component of the light.

16. A system, comprising:
a data storage devices configured to store therein lens shading correction profile data for correcting image data produced by a photosensitive element array to account for a lens shading effect produced by light passing through a lens and received at a plurality of photosensitive elements of the photosensitive element array; and
one or more processors configured to:
calculate first intensity values for each of a plurality of first portions of the light received by a corresponding first plurality of photosensitive elements of the photosensitive element array through a corresponding plurality of visible light pass filters,
calculate second intensity values for each of a plurality of second portions of the light received by a corresponding second plurality of photosensitive elements of the photosensitive element array through a corresponding plurality of infrared light pass filters,
calculate an average of the first intensity values, calculate an average of the second intensity values, calculate a normalized intensity value for the second portions of the light from the average of the first intensity values and the average of the second intensity values, and perform lens shading correction of the image data using the lens shading correction profile data and the normalized intensity value.

17. The system of claim 16, wherein the a data storage devices are further configured to store a plurality of look-up tables each comprising a different set of the lens shading correction profile data for performing the lens shading correction under each of a plurality of light conditions in which infrared components having different intensities are present, and wherein the a processors are configured to perform the lens shading correction of the image data by selecting one of the sets of the lens shading correction profile data based on the normalized intensity value, and applying the selected set of the lens shading correction profile data to the image data.

18. The system of claim 16, further comprising:

the photosensitive element array; and a filter array comprising the plurality of visible light pass filters and the plurality of infrared light pass filters.

19. The system of claim 18, wherein the filter array comprises:

a plurality of 2×2 first filter units, each first filter unit comprising one red light pass filter, two green light pass filters, and one blue light pass filter; and a plurality of 2×2 second filter units, each second filter unit comprising an infrared light pass filter and at least three selected among: a red light pass filter, two green light pass filters, and a blue light pass filter.

\* \* \* \* \*